US008436571B2

(12) United States Patent
Hao et al.

(10) Patent No.: US 8,436,571 B2

(45) Date of Patent: May 7, 2013

(54) ACTUATOR SYSTEM INCLUDING AN ACTIVE MATERIAL

(75) Inventors: Lei Hao, Troy, MI (US); Chandra S. Namuduri, Troy, MI (US); Kenneth J. Shoemaker, Highland, MI (US); Suresh Gopalakrishnan, Farmington Hills, MI (US); Sanjeev M. Naik, Troy, MI (US); Xiujie Gao, Troy, MI (US); Paul W. Alexander, Ypsilanti, MI (US); Richard J. Skurkis, Lake Orion, MI (US); Tony J. Deschutter, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 12/784,541

(22) Filed: May 21, 2010

(65) Prior Publication Data

US 2010/0326070 A1 Dec. 30, 2010

Related U.S. Application Data

(60) Provisional application No. 61/220,558, filed on Jun. 25, 2009.

(51) Int. Cl.
*G05B 11/01* (2006.01)

(52) U.S. Cl.
USPC ............................ 318/631; 318/127; 318/590

(58) Field of Classification Search ................. 318/127, 318/631, 590, 596, 135; 310/12.22, 328; 702/41; 60/527
See application file for complete search history.

(56) References Cited

U.S. PATENT DOCUMENTS

| | | | |
|---|---|---|---|
| 7,059,664 B2 | 6/2006 | Aase et al. | |
| 2005/0198907 A1 | 9/2005 | McKnight et al. | |
| 2010/0099346 A1 | 4/2010 | Browne et al. | |
| 2010/0112924 A1 | 5/2010 | Alexander et al. | |
| 2010/0332151 A1 * | 12/2010 | Hao et al. | 702/41 |

FOREIGN PATENT DOCUMENTS

| | | |
|---|---|---|
| CN | 1685150 A | 10/2005 |

* cited by examiner

*Primary Examiner* — Karen Masih

(57) ABSTRACT

A linear actuator associated with an actuator system for a device includes a wire cable fabricated from an active material. The linear actuator couples to the device and to the moveable element. The active material induces strain in the linear actuator in response to an activation signal. The linear actuator translates the moveable element relative to the device in response to the induced strain. An activation controller electrically connects to the linear actuator and generates the activation signal. A position feedback sensor monitors a position of the moveable element.

17 Claims, 4 Drawing Sheets

ACTUATOR SYSTEM INCLUDING AN ACTIVE MATERIAL

CROSS REFERENCE TO RELATED APPLICATIONS

This application claims the benefit of U.S. Provisional Application No. 61/220,558, filed on Jun. 25, 2009, which is incorporated herein by reference.

TECHNICAL FIELD

This disclosure is related to controlling activation of an active material.

BACKGROUND

The statements in this section merely provide background information related to the present disclosure and may not constitute prior art.

Active materials, including shape memory alloy (SMA) materials are compositions that exhibit a change in material properties, e.g., stiffness, shape, and/or dimension in response to an activation signal. An activation signal can include one or more of electrical, magnetic, thermal, and other signals, and can be passively or actively communicated to an active material to effect a change in the material property.

Shape memory alloy (SMA) materials refer to a group of metallic materials that undergo a reversible change in a characteristic property when activated by an external stimulus, including an ability to return to a previously defined shape or dimension when subjected to an activation signal, e.g., a thermal activation signal.

SMA materials undergo phase transitions leading to changes in yield strength, stiffness, dimension, and shape in response to temperature. SMA materials can exist in several different temperature-dependent phases, including martensite and austenite phases. The martensite phase refers to a more deformable and less stiff phase that occurs at lower material temperatures. The austenite phase refers to a stiffer and more rigid phase that occurs at higher material temperatures. There are transformation temperature ranges including start temperatures and end temperatures over which a shape memory alloy transforms between the martensite and austenite phases. An SMA material in the martensite phase changes into the austenite phase over an austenite transformation temperature range with increasing material temperature. An SMA material in the austenite phase changes into the martensite phase over a martensite transformation temperature range with decreasing temperature. A shape memory alloy has a lower modulus of elasticity in the martensite phase and has a higher modulus of elasticity in the austenite phase.

SMA materials can include metal alloys including platinum-group metals. Known SMA materials also include certain copper alloys (CuAlZn) and nickel-titanium-based alloys, such as near-equiatomic NiTi, known as Nitinol and some ternary alloys such as NiTiCu and NiTiNb. SMA materials including NiTi can withstand large stresses and can recover strains near 8% for low cycle use or up to about 2.5% for high cycle use.

SMA material properties include large recoverable strains due to crystallographic transformations between the martensite and austenite phases. As a result, SMA materials can provide large reversible shape changes or large force generation. SMA material behavior is due to a reversible thermoelastic crystalline phase transformation between a high symmetry parent phase, i.e., austenite phase, and a low symmetry product phase, i.e., martensite phase. The phase changes between the austenite and martensite phases occur as a result of changes in either one of stress and temperature.

Known methods for controlling activation of SMA materials include mechanical-based devices including a micro-switch. Known micro-switches have poor control associated with on/off control strategies that are based on ending position of the actuator. An overload protection mechanism is often employed to combat the poor controllability of a micro switch, which adds to cost, size and complexity.

SUMMARY

An actuator system for a device includes the device with a moveable element configured to change position in response to linear translation of a fixed point on the moveable element relative to a fixed point on the device. A linear actuator includes a wire cable fabricated from an active material and having a first end mechanically coupled to the fixed point on the device and a second end mechanically coupled to the fixed point on the moveable element. The active material induces strain in the linear actuator in response to an activation signal, and the linear actuator is configured to linearly translate the fixed point on the moveable element relative to the fixed point on the device in response to the induced strain. A position feedback sensor is configured to generate a signal indicating a present position of the moveable element and is signally connected to an activation controller. The activation controller is electrically connected to the linear actuator and is configured to generate the activation signal to move the moveable element to a preferred position.

BRIEF DESCRIPTION OF THE DRAWINGS

One or more embodiments will now be described, by way of example, with reference to the accompanying drawings, in which.

DETAILED DESCRIPTION

Figure 1:
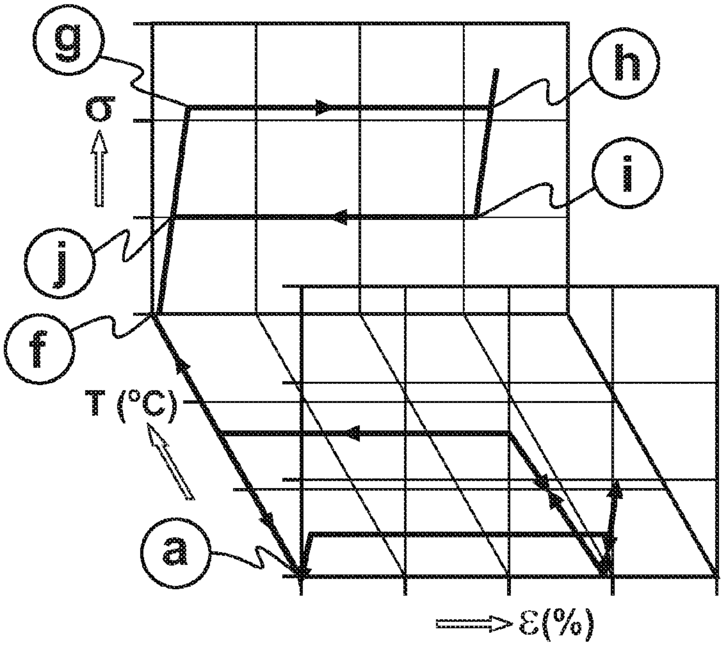
FIG. 1 is three-dimensional graphical representation indicating stress (σ), strain (ϵ), and temperature (T(° C.)) for a wire cable fabricated from an exemplary SMA material that exhibits both shape memory effect and superelastic effect under different conditions of load and temperature in accordance with the present disclosure.

Referring now to the drawings, wherein the showings are for the purpose of illustrating certain exemplary embodiments only and not for the purpose of limiting the same, FIG. 1 is a three-dimensional graphical representation indicating stress (σ), strain (ϵ), and temperature (T(° C.)) for a wire cable fabricated from an exemplary SMA material that exhibits both shape memory effect and superelastic effect under different conditions of load and temperature. Between reference points a and f, previously induced strain at lower temperature is recovered with a temperature increase. Between reference points f and g, a tensile load is applied to the SMA cable in its austenite phase, yielding a strain between reference points f and h. While remaining at a constant temperature, the SMA cable is partially unloaded between reference points h and f, wherein a majority of the induced strain is recovered between reference points i and j. While still remaining at the constant temperature, the SMA cable is completely unloaded between reference points j and f, wherein the strain is wholly recovered in the austenite phase. Between reference points f and a, the SMA cable is cooled to a material specific temperature, wherein the material changes phase from the austenite phase to martensite phase. Thus, SMA material can be applied to effect a shape change that is induced in response to an activation signal, e.g., an energizing electric current that causes one of a thermal increase and a thermal decrease in the SMA material. As described hereinbelow, in a physical constraint application, an SMA material can be applied to induce stress between connected structural members in response to the activation signal.

Figure 2:
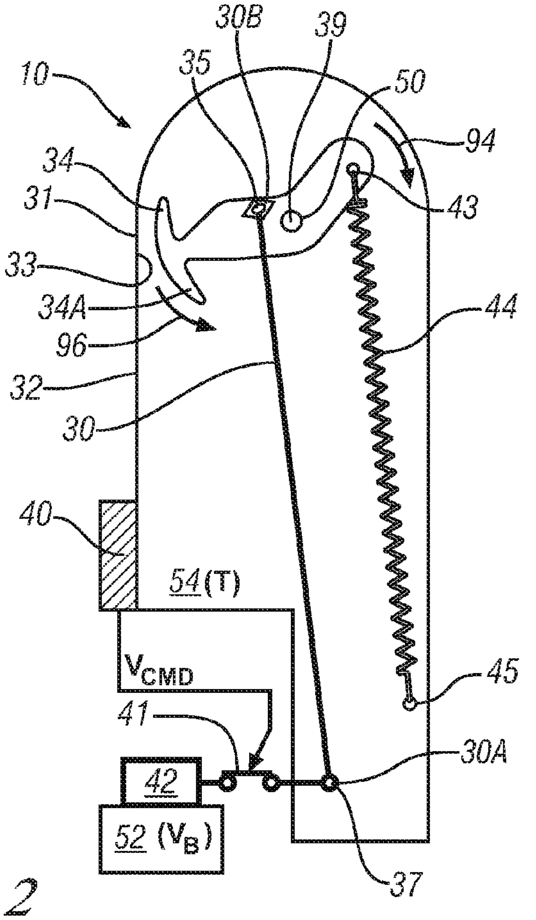
FIG. 2 shows an actuator system for a device including a housing with a rotatable element connected to a linear SMA actuator in accordance with the present disclosure.

FIG. 2 shows an actuator system for a device 10 configured in accordance with an embodiment of the disclosure. The device 10 includes a housing 32 including a rotatable element 34 pivotably mounted in the housing 32 at an axle 39. The housing 32 includes inner and outer surfaces 33 and 31, respectively. The rotatable element 34 is preferably enclosed within the inner surface 33 of the housing 32. The actuator system includes a linear SMA actuator 30 electrically connected to an activation controller 40. The linear SMA actuator 30 connects to one side of the rotatable element 34, and a mechanical biasing member 44 mechanically couples to the rotatable element 34 on an opposed side relative to the axle 39. The linear SMA actuator 30 and the biasing member 44 apply opposed tensile forces across a pivot point corresponding to the axle 39 resulting in opposed torque arms. A position feedback sensor 50 is configured to monitor the position of the rotatable device 34, e.g., a rotational position. The activation controller 40 monitors signal input from the position feedback sensor 50 and generates an activation signal $W_{CMD}$ that controls an energizing current to activate the linear SMA actuator 30.

The linear SMA actuator 30 includes a wire cable fabricated from single or multiple strands of active material preferably including an SMA material. A first end 30A of the linear SMA actuator 30 mechanically couples to a fixed anchor point 37 on the device 10. A second end 30B of the linear SMA actuator 30 mechanically couples to a fixed anchor point 35 on the rotatable device 34. The linear SMA actuator 30 induces a torque on the rotatable device 34 relative to the axle 39 when activated, causing an element 34A of the rotatable device 34 to rotate. Alternative embodiments of active materials include electroactive polymers (EAPs), piezoelectric, magnetostrictive and electrorestrictive materials. It will be appreciated that active material members can be utilized in a wide variety of shapes depending upon the desired function of the device and the activation force required of the member.

The activation controller 40 electrically connects to the linear SMA actuator 30 at the first end 30A and at the second end 30B and generates the activation signal $V_{CMD}$ that controls the energizing current to activate the linear SMA actuator 30. In one embodiment, the energizing current controlled by the activation signal $V_{CMD}$ passes through the linear SMA actuator 30 and causes a temperature change therein to induce strain in the linear SMA actuator 30, causing it to either physically extend or retract the end 30B relative to the first end 30A, thus inducing the torque on the rotatable device 34 to linearly translate the fixed anchor point 35 relative to the fixed anchor point 37 on the device 10. The activation signal $V_{CMD}$ can be used, e.g., to control overall magnitude of electric current associated with the energizing current, or to control an average or RMS magnitude of electric current associated with the energizing current when the electric current is pulsewidth-modulated or otherwise alternating. It is appreciated that there are other embodiments to provide the activation signal $V_{CMD}$ to control the energizing current.

In one embodiment, the activation controller 40 electrically connects to a switch device 41 to control the energizing current to the linear SMA actuator 30 in response to the activation signal $V_{CMD}$. The switch device 41 controls the energizing current by controlling electric current flow from an energy storage device 42, e.g., a battery, to the first end 30A of the linear SMA actuator 30 at the fixed anchor point 37 via a wiring harness. As depicted, the switch device 41 is in an activated state. The switch device 41 may take any suitable form including a mechanical, electromechanical, power switch device or solid-state device, e.g., IGBT and MOSFET devices. Alternatively, the switch device 41 can be a voltage regulator.

The biasing member 44 connects to the rotatable device 34 and includes a mechanical spring device in one embodiment with first and second ends 43 and 45, respectively. The first end 43 is mechanically coupled to the rotatable device 34 and the second end 45 is mechanically anchored to the inner surface 33 of the housing 32.

The position feedback sensor 50 is used to monitor a position of the rotatable device 34 from which a present position ($P_M$) associated with the element 34A can be determined. The position feedback sensor 50 is preferably signally connected to the activation controller 40. The position feedback sensor 50 is a rotary position sensor attached to the axle 39 and is configured to measure rotational angle of the rotatable device 34 in one embodiment. In one embodiment the rotary position sensor 50 is a potentiometer configured to provide feedback position, and is integrated into the housing 32 of the device 10. Alternatively, other feedback sensors can monitor one of a rotational angle, a linear movement, magnitude of applied or exerted force through the element 34A of rotatable device 34, and electric current and/or resistance through the linear SMA actuator 30 to obtain the position of the rotatable device 34. Other sensors providing signal inputs to the activation controller 40 include a voltage monitoring sensor to monitor output voltage ($V_B$) of the energy storage device 42 and a temperature monitoring sensor to monitor ambient temperature ($T_A$) at or near the linear SMA actuator 30.

The rotatable device 34 rotates about the axle 39 when the linear SMA actuator 30 linearly translates the second end 30B relative to the first end 30A in response to the activation signal $V_{CMD}$ from the activation controller 40, changing the position of the element 34A.

In the embodiment shown, the linear SMA actuator 30 linearly translates the rotatable device 34 at the fixed anchor point 35. The linear translation at the fixed anchor point 35 causes the rotatable device 34 to rotate around the axle 39, causing rotation of the element 34A. It will be appreciated that alternative embodiments can involve linear translation of devices connected to the linear SMA actuator 30 and associated rotations and translations.

When the linear SMA actuator 30 is deactivated the biasing member 44 exerts a biasing force 94 on the rotatable device 34, producing a stress imposing a strain on the linear SMA actuator 30 and thereby stretching the linear SMA actuator 30. When the linear SMA actuator 30 is activated the linear SMA actuator 30 recovers imposed strain associated with the biasing member, and exerts an opposing force 96 on the biasing member 44, overcoming the biasing force 94 and rotating the rotatable device 34 about the axle 39 and rotating or linearly translating the element 34A. The activation controller 40 is configured to receive a reference signal or a command signal ($P_C$), and generates the activation signal $V_{CMD}$ in response to the reference signal and the feedback signal indicating the present position ($P_M$) associated with the element 34A. The command signal ($P_C$) can include a predetermined discrete position associated with the element 34A, e.g., opened or closed. Alternatively, the command signal ($P_C$) can include a linear position associated with the element 34A, e.g., a percent-opened or percent-closed position. The command signal ($P_C$) can be generated by another control scheme, or can be generated by an operator via a user interface. The command signal ($P_C$) can activate or deactivate the device 10 in response to vehicle conditions. Non-limiting examples of vehicle conditions that generate the command signal ($P_C$) include a door-opening or door-closing event and a hatch opening or closing event.

The activation controller 40 compares the feedback signal indicating the present position ($P_M$) associated with the element 34A and the command signal ($P_C$), and generates the activation signal $V_{CMD}$ correspondingly. The activation signal $V_{CMD}$ is used to generate an energizing current across the linear SMA actuator 30 by controlling electric power using pulsewidth-modulation (PWM) or voltage regulation. The activation controller 40 preferably includes a microcontroller to execute a control algorithm and an electric circuit to generate the activation signal $V_{CMD}$ that is communicated to a power stage, e.g., a PWM controller to enable and disable the energizing current flowing through the linear SMA actuator 30. A time-based derivative of the present position ($P_M$) position signal can be used for overload protection and precise control.

Figure 3:
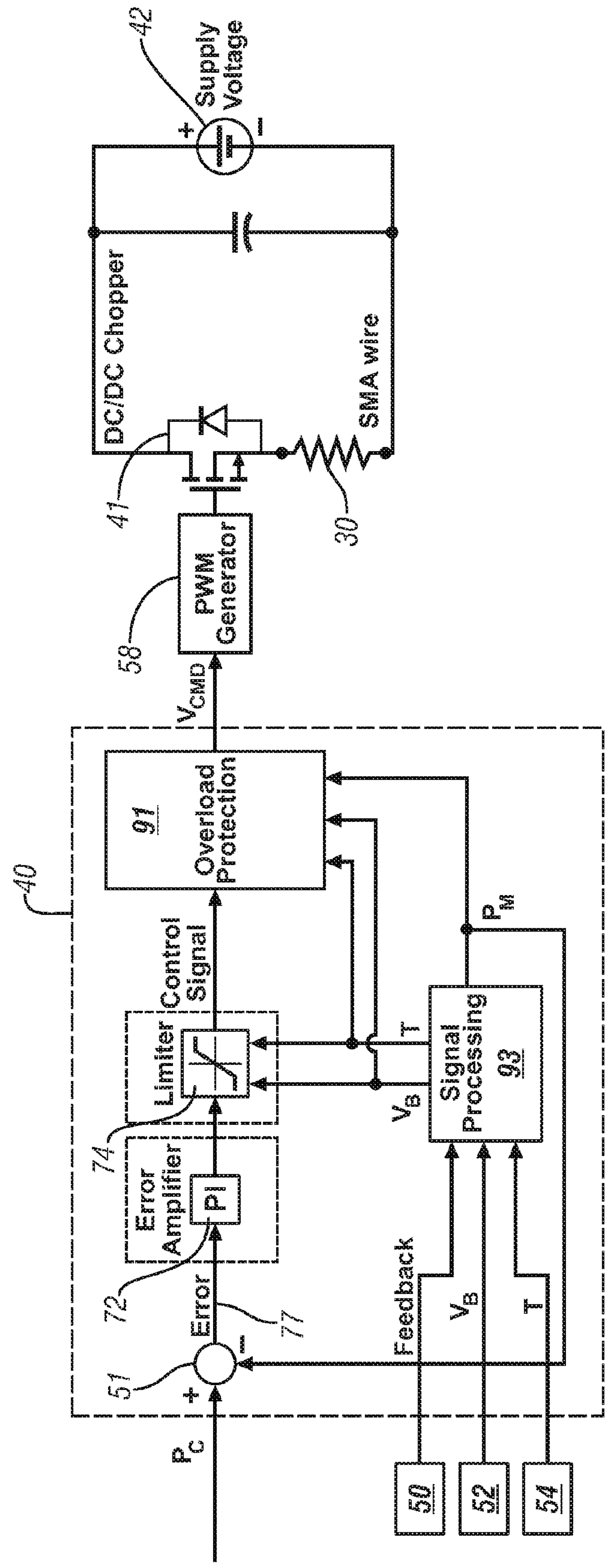
FIGS. 3 and 4 each show a detailed schematic diagram of a control circuit including an activation controller to control position of a device using a linear SMA actuator in accordance with the present disclosure.

FIG. 3 shows a detailed schematic diagram of an embodiment of a control circuit for the activation controller 40 to control position of a device, e.g., to control position of element 34A of the rotatable device 34. The activation controller 40 includes a control circuit to generate the activation signal $V_{CMD}$ to control a PWM generator 58 that controls the energizing current to the linear SMA actuator 30 via switch device 41. Alternatively, the activation controller 40 includes a control circuit to generate the activation signal $V_{CMD}$ can include a voltage regulator device that controls the energizing current to the linear SMA actuator 30.

A command signal ($P_C$) is generated, which can be a preferred position of a device, e.g., a preferred position of element 34A of rotatable device 34. The position feedback sensor 50 measures an input signal which is input to a signal processing circuit 93, from which a present position ($P_M$) of an element of interest, e.g., position of element 34A of rotatable device 34 is determined. The signal processing circuit 93 also monitors signal inputs from a supply voltage signal 52 and an ambient temperature sensor 54 to determine voltage potential ($V_B$) and ambient temperature (T).

The present position ($P_M$) and the preferred position ($P_C$) are compared using a difference unit 51 that determines a position difference (Error) that is input to an error amplifier 72. The error amplifier 72 preferably includes a PI controller, and generates a control signal that is communicated to a signal limiter 74. The signal limiter 74 imposes limits on the control signal, including maximum and minimum control signal values associated with the voltage potential ($V_B$) and the ambient temperature (T). An overload protection scheme 91 monitors the control signal in context of the voltage potential ($V_B$) output from the energy storage device 42, the ambient temperature (T), and the present position ($P_M$) of element 34A of rotatable device 34 to detect a mechanical overload condition and execute overload protection to prevent commanding a control signal that may mechanically overload the linear SMA actuator 30. A final control signal, i.e., the activation signal $V_{CMD}$ includes a duty cycle control signal for controlling the linear SMA actuator 30 that is output to an actuator, e.g., one of the PWM generator 58 and associated switch device 41. An exemplary overload protection scheme is described with reference to FIG. 5.

Figure 4:
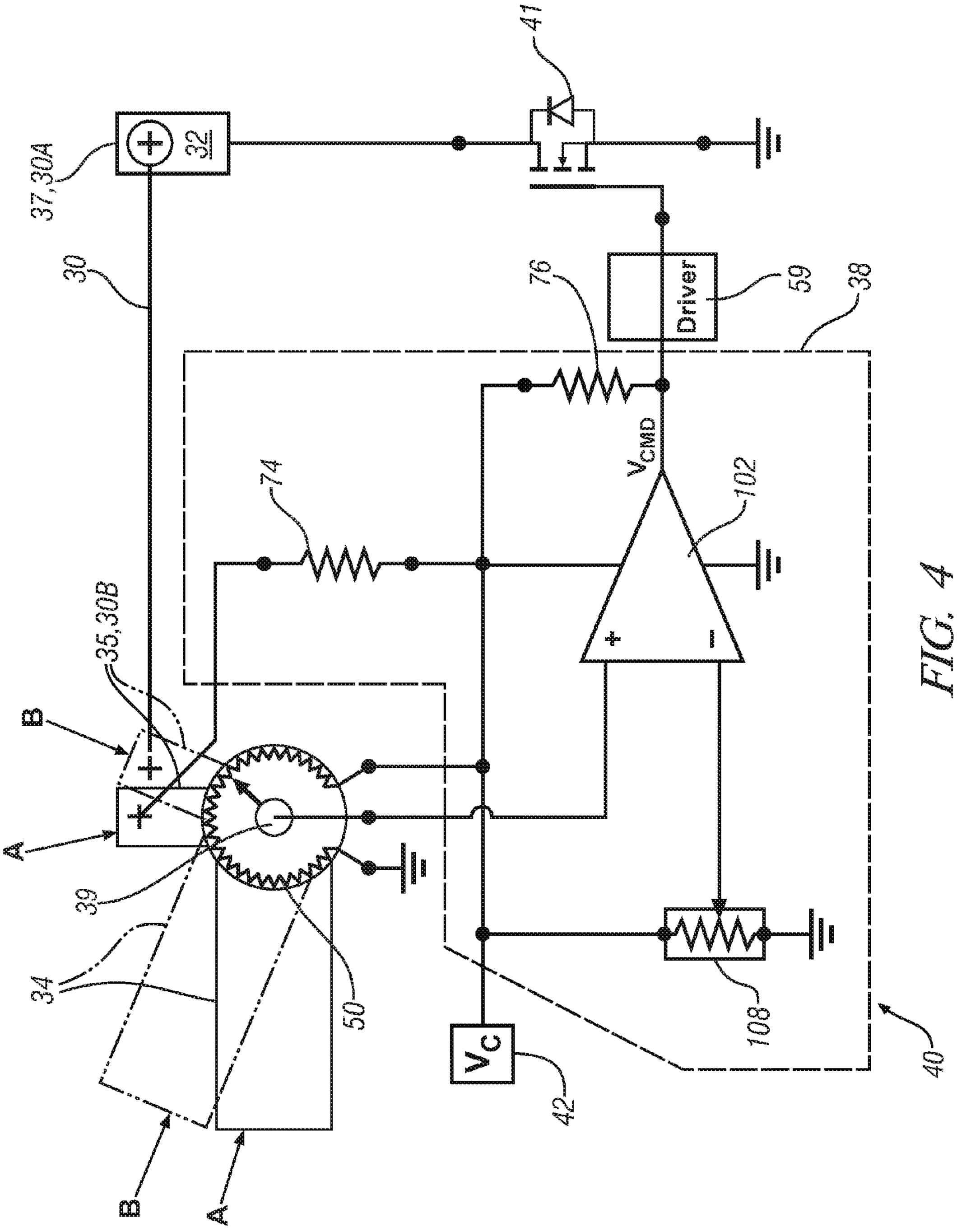

FIG. 4 is a schematic diagram showing details of an embodiment of a control circuit 38 used by the activation controller 40 to control the energizing current transferred to the linear SMA actuator 30, including position sensor 50. The position sensor 50 is a potentiometer device configured to operate as a rotary position sensing device as depicted. The control circuit 38 includes a linear comparator device 102, which can be an operational amplifier in one embodiment. The energy storage device 42 supplies an output voltage ($V_C$) to provide electric power to the position sensor 50 and the linear comparator device 102. The output voltage ($V_C$) can be 0 V DC, which deactivates the control circuit 38 to control the linear SMA actuator 30 in an extended state (A) with corresponding rotation of the rotatable element 34. The controllable output voltage ($V_C$) can be 5 V DC or another suitable voltage level to activate the control circuit 38 to control the linear SMA actuator 30 in a retracted state (B) with corresponding rotation of the rotatable element 34.

When the energy storage device 42 controls the output voltage ($V_C$) to activate the control circuit 38, electric power is provided to the linear SMA actuator 30, causing it to retract. The position sensor 50 generates a signal input to the positive (+) input of the linear comparator device 102. A signal input to the negative (−) input of the linear comparator device 102 is a calibratable reference voltage that can be set using a variable resistor device 108 that forms a voltage divider. It is appreciated that the reference voltage input to the negative (−) input of the linear comparator device 102 can be generated using other devices and methods. The reference voltage to the negative (−) input of the linear comparator device 102 controls the linear SMA actuator 30 to a predetermined length associated with the retracted state (B) and correspondingly rotates the rotatable element 34 when the control circuit 38 is activated by providing electric power via the energy storage device 42. The comparator 102 generates an output voltage that corresponds to the activation signal $V_{CMD}$ that can be input to an optional circuit driver in one embodiment. The voltage limiter 74, which is in the form of a resistor device in one embodiment, is electrically connected between the second end 30B of the linear SMA actuator 30 and the energy storage device 42. There is a pull-up resistor 76 electrically connected between the energy storage device 42 and the output pin of the comparator 102.

The linear SMA actuator 30 includes first and second ends 30A and 30B, respectively wherein the second end 30B is mechanically coupled to the fixed anchor point 35 on the rotatable device 34 and the first end 30A is mechanically anchored to the fixed anchor point 37 on an inner surface of housing 32. The feedback voltage from the position sensor 50 is input to comparator 102, wherein the feedback voltage is compared to the reference voltage. The comparator device 102 generates the activation signal $V_{CMD}$ and signally connects to a circuit driver (Driver) 59 to control switch device 41 to control electric power to the linear SMA actuator 30 responsive to the activation signal $V_{CMD}$. Alternatively, the circuit driver (Driver) 59 and switch 41 can be replaced with a voltage regulator device to control the energizing current to the linear SMA actuator 30. The comparator 102 is configured to control the energizing current and associated material temperature and therefore the length of the linear SMA actuator 30. Because the feedback voltage from the position sensor 50 is used to control the length of the linear SMA actuator 30, any outside forces such as temperature or air currents are internally compensated. In operation, so long as the feedback voltage from the position sensor 50 is less than the reference voltage, the activation signal $V_{CMD}$ controls the switch device 41 to transfer the energizing current across the linear SMA actuator 30. When the feedback voltage from the position sensor 50 is greater than the reference voltage, the activation signal $V_{CMD}$ output from the comparator 102 drops to zero, serving to deactivate the switch device 41 to interrupt and discontinue the energizing current across the linear SMA actuator 30. The rotatable element 34 is shown in the first position (A) associated with the deactivated state and the second position (B) associated with the activated state, which correspond to the reference voltage of the voltage divider 108 at 0 V DC and 5 V DC, respectively, in one embodiment.

Figure 5:
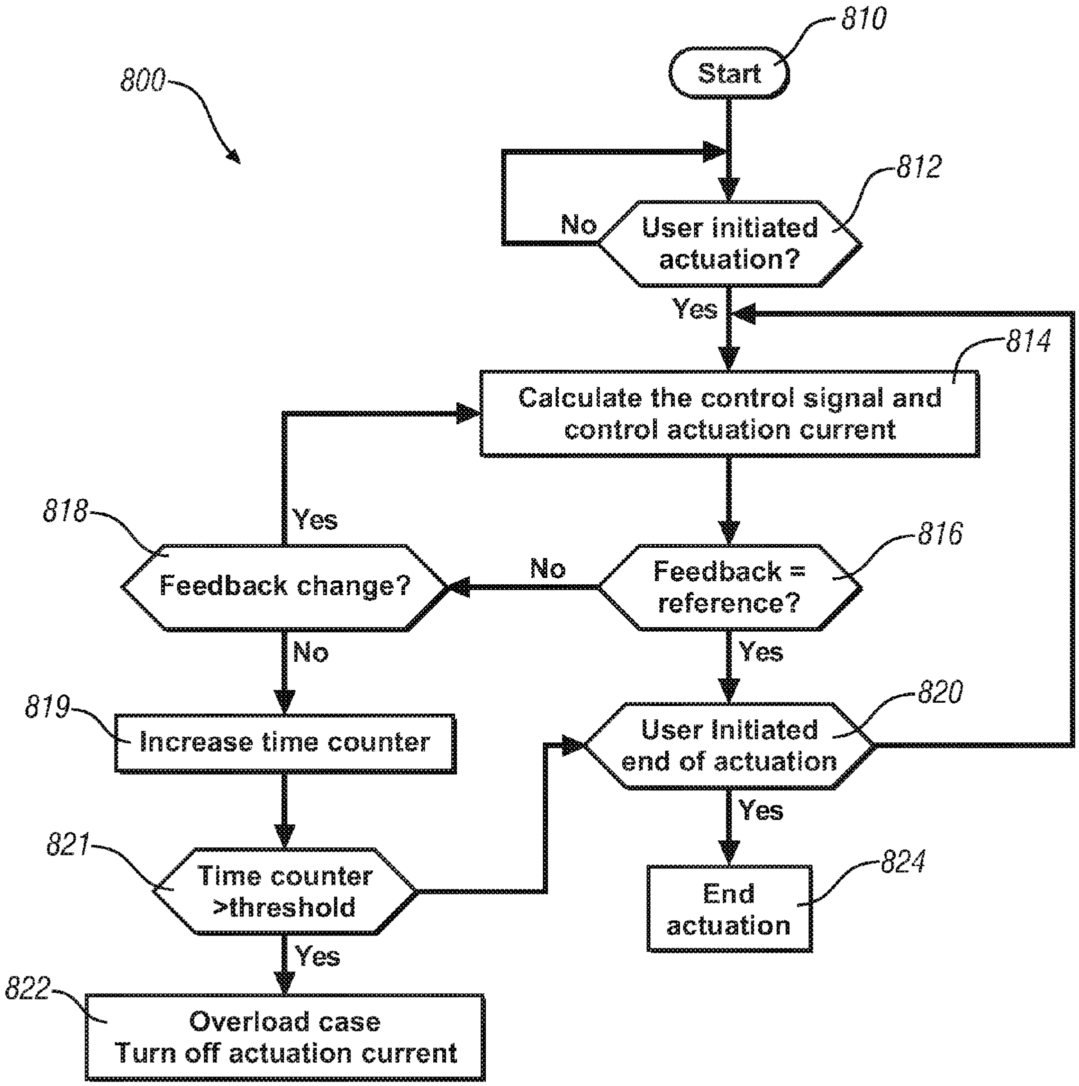
FIG. 5 is a flowchart including an exemplary overload protection scheme associated with operating an activation controller to control energizing current transferred to a linear SMA actuator in accordance with the present disclosure.

FIG. 5 schematically shows a flowchart 800 including an exemplary overload protection scheme. The flowchart 800 describes operating the activation controller 40 to control the energizing current transferred to the linear SMA actuator 30, including monitoring a position of rotatable device 34 mechanically coupled to the linear SMA actuator 30 using the position sensor 50. The position sensor 50 provides feedback to the activation controller 40 descriptive of a present position of the rotatable device 34. During ongoing system operation (810), there can be a user-initiated activation (812) requesting movement of the rotatable device 34 to a preferred position. It is appreciated that the user-initiated activation (812) may originate from an operator input to a human-machine interface device, or alternatively the user-initiated activation (812) may originate from another device. The preferred position may be a fixed position, or alternatively the preferred position may be associated with a position profile that is based upon an elapsed time of activation.

The activation controller 40 calculates a control signal for controlling position of the rotatable device 34 and controls activation current to the linear SMA actuator 30 (814). A signal output (Feedback) from the position sensor 50 is compared to a reference signal (reference) corresponding to the rotatable device 34 at the preferred position (816).

During activation, signal output of the position sensor 50 is monitored to determine whether there has been a change in position of the rotatable device 34 (Feedback Change) (818). The signal output of the position sensor 50 can be monitored to determine whether there has been a discernible change in position of the rotatable device 34 since a previous iteration. Alternatively, the signal output of the position sensor 50 can be monitored over time and a time-based derivative of the position of the rotatable device 34 can be calculated to determine whether there has been a discernible change in position of the rotatable device 34.

So long as there is a discernible change in the position of the rotatable device 34, the activation controller 40 calculates a control signal for controlling position of the rotatable device 34 and controls activation current to the linear SMA actuator 30 (814). When there is no discernible change in the position of the rotatable device 34, a time counter is incremented (819), and the time counter is compared to a threshold (821). When there is no discernible change in the position of the rotatable device 34 and the time counter exceeds the threshold, the activation controller 40 detects an overload event, and discontinues the activation current to the linear SMA actuator 30 (822). When the signal output (Feedback) from the position sensor 50 equals the reference signal (reference), it is determined whether the user has initiated an end of actuation (820). If there is no user-initiated end of actuation, the activation controller 40 calculates a control signal for controlling position of the rotatable device 34 and controls activation current to the linear SMA actuator 30 (814). When the user has initiated an end of actuation, indicating that the rotatable device 34 is positioned at the preferred position, the activation controller 40 discontinues the activation current to the linear SMA actuator 30 (824).

In an alternate embodiment, the signal output (Feedback) from the position sensor 50 is compared to the reference signal (reference) corresponding to the rotatable device 34 at the preferred position, with the preferred position associated with the aforementioned position profile based upon an elapsed time of activation of the activation signal (816). In one embodiment the position profile includes the preferred position monotonically changing over the elapsed time of activation of the activation signal. A discernible change in the position of the rotatable device 34 defined as a change in the position of the rotatable device 34 that corresponds to the position profile.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Actuator system for a device, comprising:

a device including a moveable element configured to change position in response to linear translation of a fixed point on the moveable element relative to a fixed point on the device;

a linear actuator comprising a wire cable fabricated from an active material and including a first end mechanically coupled to the fixed point on the device and a second end mechanically coupled to the fixed point on the moveable element, the active material inducing strain in the linear actuator in response to an activation signal, and the linear actuator configured to linearly translate the fixed point on the moveable element relative to the fixed point on the device in response to the induced strain;

a position feedback sensor configured to generate a signal indicating a present position of the moveable element and signally connected to an activation controller; and the activation controller electrically connected to the linear actuator and configured to generate the activation signal to move the moveable element to a preferred position.

2. The actuator system of claim 1, wherein the activation controller further comprises an overload protection scheme configured to deactivate the activation signal when there is no discernible change in the present position of the moveable element and the moveable element fails to achieve the preferred position.

3. The actuator system of claim 2, wherein the discernible change in the present position of the moveable element comprises a time-based derivative of the present position of the moveable element.

4. The actuator system of claim 1, wherein the activation controller further comprises an overload protection scheme configured to deactivate the activation signal when the moveable element fails to achieve the preferred position, wherein the preferred position is determined based upon a position profile and an elapsed time of activation of the activation signal.

5. The actuator system of claim 1, wherein the activation controller generates the activation signal in response to the preferred position of the moveable element and the present position of the moveable element.

6. The actuator system of claim 1, further comprising the activation controller electrically connected to the linear actuator and configured to generate the activation signal in response to a command to move the moveable element to a preferred position.

7. The actuator system of claim 1, comprising the activation controller signally connected to the position feedback sensor and electrically connected to the linear actuator to generate the activation signal in response to a preferred position of the moveable element and the present position of the moveable element.

8. The actuator system of claim 1, further comprising the activation controller electrically connected to the linear actuator to control an energizing current through the linear actuator, wherein magnitude of the energizing current is responsive to the activation signal.

9. The actuator system of claim 1, further comprising:
- the moveable element rotatably mounted on an axle;
- the second end of the linear actuator mechanically coupled to the fixed point on the moveable element on a first side of the axle; and
- a mechanical biasing member mechanically coupled to the moveable element on a second side of the axle opposed to the first side.

10. Actuator system for a moveable element of a device, comprising:
- a linear actuator comprising a wire cable fabricated from an active material and including a first end mechanically coupled to a fixed point on the device and a second end mechanically coupled to a fixed point on the moveable element,
- a position feedback sensor configured to monitor a present position of the moveable element;
- an activation controller electrically connected to the linear actuator and configured to generate an activation signal in response to a preferred position of the moveable element;
- the active material operative to induce strain in the linear actuator responsive to the activation signal; and
- the linear actuator configured to translate the fixed point on the moveable element relative to the fixed point on the device in response to the induced strain.

11. The actuator system of claim 10, further comprising the activation controller signally connected to the position feedback sensor and electrically connected to the linear actuator to generate the activation signal responsive to the present position of the moveable element.

12. The actuator system of claim 11, further comprising the activation controller configured to control an energizing current through the linear actuator responsive to the activation signal.

13. The actuator system of claim 12, further comprising the activation controller signally connected to the position feedback sensor and electrically connected to the linear actuator to generate the activation signal responsive to the present position of the moveable element and to prevent an overload condition in the linear actuator.

14. The actuator system of claim 13, further comprising the activation controller configured to control the energizing current through the linear actuator responsive to the activation signal and to prevent an overload condition in the linear actuator.

15. The actuator system of claim 10, wherein the activation controller further comprises an overload protection scheme configured to deactivate the activation signal when there is no discernible change in the present position of the moveable element and the moveable element fails to achieve the preferred position.

16. The actuator system of claim 15, wherein the discernible change in the present position of the moveable element comprises a time-based derivative of the present position of the moveable element.

17. The actuator system of claim 10, wherein the activation controller further comprises an overload protection scheme configured to deactivate the activation signal when the moveable element fails to achieve the preferred position, wherein the preferred position is determined based upon a position profile and an elapsed time of activation of the activation signal.

* * * * *